Nov. 30, 1965   C. R. AMSLER ETAL   3,220,265
GYROSCOPIC INSTRUMENT
Filed Feb. 24, 1964
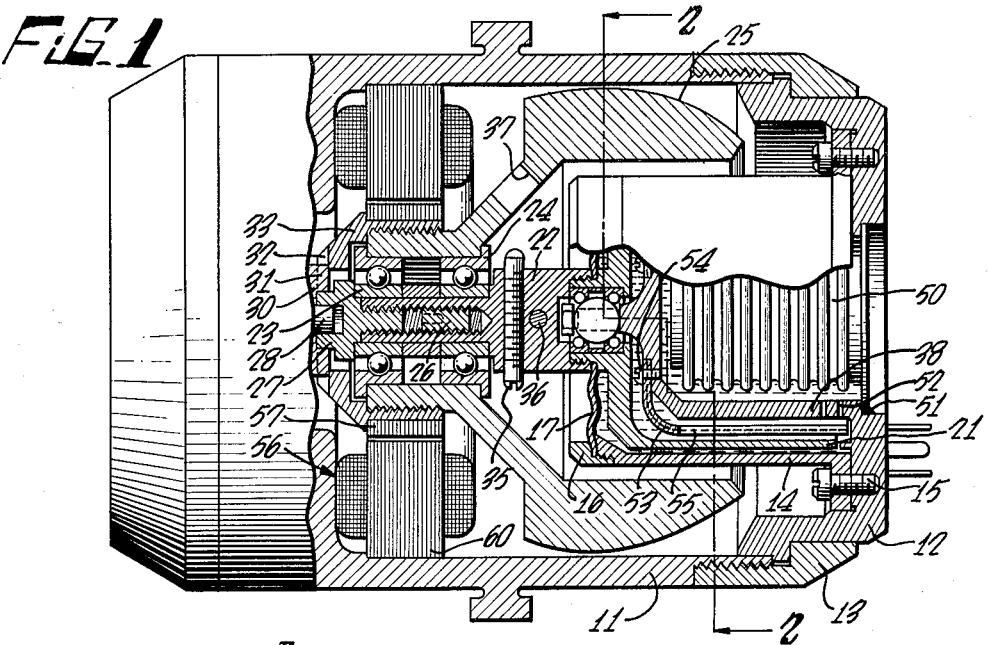
INVENTORS.
CLYDE R. AMSLER
EDGAR R. BRASTOW
BY
*Fred N. Schwend*
ATTORNEY.

3,220,265
GYROSCOPIC INSTRUMENT
Clyde R. Amsler, Santa Monica Canyon, and Edgar R. Brastow, Woodland Hills, Calif., assignors to Clary Corporation, San Gabriel, Calif., a corporation of California
Filed Feb. 24, 1964, Ser. No. 346,619
6 Claims. (Cl. 74—5.5)

This invention relates to gyroscopic instruments and has particular reference to two-axis rate gyroscopes.

A rate gyroscope generally provides an indication, by way of an output signal, which constitutes a measure of the angular rate at which the gyroscope base or housing is being turned about an input axis. Such input axis extends perpendicular to the rotor spin axis and, in the case of a two-axis gyroscope, such input axis may be any axis perpendicular to the spin axis.

A gimbal restraint means, such as a spring, is provided to resist precessing of the gyroscope and such means deflects an amount proportional to the angular rate of input. Such deflection therefore constitutes a measure of the amount of input rate. An equilibrium point is reached when the torque developed by the restraint means balances out the gyroscopic torque developed from the input angular rate. When the input movement recedes to zero, the restraint means returns the rotor to an initial or normal position relative to the housing.

A principal object of the present invention is to provide a small compact two-axis rate gyroscopic instrument.

Another object is to provide a two-axis rate gyroscopic instrument which is economical to manufacture and yet highly sensitive and of rugged construction.

Another object is to provide a two-axis rate gyroscopic instrument having a gimbal system of minimum frictional torque.

Another object is to provide a two-axis rate gyro having an effective temperature compensated fluid dampening system.

The manner in which the above and other objects of the invention are accomplished will be readily understood on reference to the following specification when read in conjunction with the accompanying drawings, wherein:

FIG. 1 is a side view, partly in section, of a two-axis rate gyroscope embodying a preferred form of the present invention.

FIG. 2 is a transverse sectional view of the gyroscope and is taken substantially along the line 2—2 of FIG. 1.

FIG. 3 is an enlarged fragmentary sectional view illustrating the means for restricting axial movement of the spindle and rotor.

FIG. 4 is a sectional view similar to FIG. 3 but illustrating a modified form of the invention.

Referring to the drawing, the gyroscope comprises a three-part housing including a case 11, an end cap 12 and a clamp nut 13. The latter is removably threaded onto the case to retain the end cap firmly in place at one end of the case. The cap may also hermetically seal the interior of the housing.

An annular outer cup 14 is secured to the interior of the end cap 12 by clamp screws 15. A clamp nut 16 is screw-threaded to the outer end of the cup 14 to clamp the outer periphery of a thin spring diaphragm 17 against the cup 14. The diaphragm is formed of a temperature and age stable, low hysteresis alloy such as that commercially available under the trade name Ni-Span-C. The diaphragm is corrugated annularly so that its center portion can be conveniently tilted about any axis extending through the general plane, i.e. 18, of the diaphragm.

The diaphragm is formed with a central opening 20 therein and a shaft assembly is secured therein. The shaft assembly is formed of an annular or cylindrical, damping cup 21 having a reduced end portion extending through the opening in the diaphragm and secured thereto by a gimbal shaft or bearing member 22 which is screw-threaded onto the cup 21 to clamp the center section of the diaphragm therebetween.

The shaft 22 has a reduced diameter section on which spaced ball bearings 23 and 24 are mounted. The latter, in turn, rotatably support a rotor 25.

The shaft has a screw-threaded axially extending hole formed therein in which is threaded a balance adjustment weight 26. A retainer member 27 is threadably attached in the opening to retain the ball bearings 23 and 24 in place and has an axial hole therein in which is normally inserted a caging pin 28 carried by a drive member 30 forming part of the driving and caging device.

The drive member 30 has diametrically arranged tongue portions 31 which engage grooves 32 formed in an end cap 33 which is screw-threadably attached to the rotor 25.

Suitable means (not shown), such as that disclosed and claimed in the copending application of G. F. East et al., Serial No. 174,899, filed February 21, 1962, are provided for first rotating the drive member 31 so as to bring the rotor up to speed and for thereafter moving the drive member to the left in FIG. 1 so as to first uncouple the drive member from the rotor and subsequently withdraw or uncage the caging pin 28 from the member 27 so that the rotor can maintain its position in space as will be described later.

Balance screws 35 and 36 are screw-threaded through the shaft at right angles to each other. These screws are adjustable by a suitable tool, such as a screw driver insertable through an opening 37 in the rotor, so as to properly balance the rotor assembly.

Means are provided for preventing appreciable axial movement of the rotor and shaft assembly relative to the housing, and for this purpose the end cap 12 of the housing is formed with an inwardly extending annular cup section or member 38 which extends into and lies concentric with the outer cup 14. A spherical member or centralizing sphere 40 is secured to the inner cup 38 by a clamp nut 41 which engages a threaded extension of a mounting shaft portion 39 of cup section 38. The latter extends through the center of the spherical member 40. The spherical member is located with its center C lying coincident with the general plane 18 of the diaphragm and with the center of the same.

Two ball bearing races 42 and 43 are mounted in a socket 44 formed in the damping cup 21. The races are located in place by a spacer sleeve 45 and clamped in place by the shaft 22. The races guide two rows of bearing balls 46 which rotatably engage the spherical member 40 on opposite sides of the general plane 18 to prevent appreciable axial movement of the rotor and spindle assembly relative to the housing.

As shown in FIG. 3, lines 47 and 48 extending through the centers of diametrically disposed balls in the two races intersect each other at a point coincident with the center C of the spherical member 40 so that the balls 46 are effective to guide the shaft assembly against axial movement relative to the center of the spherical member 40 while developing a minimum of unwanted precession forces. However, actually, a slight clearance is maintained between the balls 46 and the spherical member 40 so that a certain amount of end play or freedom, on the order of .0005 to .001 inch, is permitted along the spin axis of the rotor. Thus, the diaphragm becomes the sole pivotal support for the rotor and shaft assembly, and the spherical member 40 becomes effective only to retain the rotor and spin axis against appreciable end movement under angular accelerations beyond the normal range of the instrument.

Preferably, the balance weight 26 is adjusted along the shaft 22 to a point where the center of gravity of the combined rotor and shaft assembly coincides with the center C of the spherical member 40 which also forms the gimbal center for the rotor, as noted hereinbefore.

Means are provided to both dampen the natural period of the diaphragm 17 and to exert a damping restraint on the gyroscope. A flexible bellows 50 is located within the inner cup member 38 and its base is suitably sealed at 51 to the end cap.

A suitable damping fluid is provided in the damping chamber formed by the cup members 14 and 38 and also in the space between the inner cup member 38 and the bellows 50, openings 52 being provided in the wall of cup member 38 to permit free passage of fluid between the inside and outside surfaces of the cup member. The bellows acts to compensate for expansion and contraction of the damping fluid in response to changes in ambient temperature, etc., so as to maintain the fluid under pressure greater than the vapor pressure of the fluid and maintain the damping chamber filled at all times.

It will be noted that the damping cup 21 extends between the inner and outer cups 14 and 38 and normally lies concentric with both when the gyroscope is in equilibrium.

Means are provided to compensate for changes in damping characteristics of the damping fluid against the damping cup 21 due to temperature changes. For this purpose, a damping compensator cup 53 is secured by screws 54 to the inner cup 38 and extends between the damping cup 21 and the inner cup 52. The compensator 53 extends concentrically of the inner cup 38 and may be formed of a temperature-responsive bi-metal material. The compensator has a plurality of longitudinally extending slits 55 formed therearound so that its periphery may expand and contract in response to changes in temperature of the damping fluid. This radial movement of the sides of the compensator to and from proximity to the inner periphery of the damping cup 21 appropriately changes the damping effect of the damping fluid against the damping cup.

A pick-off or signal generator, generally indicated at 56, is provided to indicate the movement of the housing about any input axis. The device comprises a rotor 57 suitably attached to the rotor cap 33 and a stator 60 suitably attached to the interior of the case 11 and magnetically coupled to the rotor 57. The pick-off device may be of any suitable type, preferably operated by alternating current to emit signals which vary in size and magnitude in proportion to displacements between the rotor 57 and stator 60.

FIG. 4 illustrates a modified form of the invention wherein the spherical member 40', similar to member 40 of FIG. 3, is provided with a shank 64 which is screw-threadedly attached to the bearing member 22', similar to member 22 of FIGS. 1 and 3. In this case, the bearing races 42' and 43' are mounted in a socket formed in cup section 38', similar to cup section 38, and are retained by a nut 61.

A cup formation 62 is formed on the shaft section 22' and has the inner portion of the diaphragm 17' clamped thereto by a nut 63.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A gyroscopic instrument comprising a support, a flexible diaphragm supported adjacent its periphery by said support, a bearing member rigidly secured to said diaphragm at the center of said diaphragm, said diaphragm supporting said bearing member for pivotal movement about an axis coincident with the general plane of said diaphragm, a rotor supported by said bearing member for rotation about a spin axis, a pick-off device for indicating the angular movement of said support relative to said spin axis, and means other than said diaphragm for restricting movement of said rotor and said bearing member along said spin axis relative to said support.

2. A gyroscopic instrument comprising a support, a diaphragm of compliant material supported adjacent its periphery by said support, a bearing member rigidly secured to said diaphragm adjacent the center of said diaphragm, said diaphragm supporting said bearing member for pivotal movement and normally maintaining said bearing member in a predetermined pivoted position relative to said support, a rotor supported by said bearing member for rotation about a spin axis, means restraining said support against movement relative to said rotor along said spin axis, and a pick-off device for indicating the angular movement of said support relative to said spin axis.

3. A gyroscopic instrument comprising a support member, a diaphragm of spring material supported adjacent its periphery by said support member, a shaft member rigidly secured to said diaphragm adjacent the center of said diaphragm, said diaphragm pivotally supporting said shaft member and normally maintaining said shaft member in a predetermined angular position relative to said support member, a rotor mounted on said shaft member for rotation about a spin axis, a spherical member supported by one of said members, said spherical member having its center coincident with the center of said diaphragm and located in the general plane of said diaphragm, guide means on the other of said members, said guide means being engageable with said spherical member for preventing movement of said other member along said spin axis relative to said one member, and a pick-off device for indicating the angular movement of said support member relative to said shaft member.

4. A gyroscopic instrument comprising a support, a diaphragm of compliant material supported adjacent its periphery by said support, a shaft rigidly secured to said diaphragm adjacent the center of said diaphragm, said diaphragm pivotally supporting said shaft and normally maintaining said shaft in a predetermined angular position relative to said support, a rotor mounted on said shaft for rotation about a spin axis, means on one side of said diaphragm forming a damping chamber, a damping fluid in said chamber, a damping member operatively connected to said shaft and extending into said chamber, a thermostatically controlled member extending into said chamber and adapted to vary the damping action of said fluid in accordance with the temperature of said fluid, and a pick-off device for indicating the angular movement of said support relative to said shaft.

5. A gyroscopic instrument comprising a support,
a diaphragm of compliant material supported adjacent its periphery by said support,
a shaft rigidly secured to said diaphragm adjacent the center of said diaphragm,
said diaphragm pivotally supporting said shaft and normally maintaining said shaft in a predetermined position relative to said support,
a rotor mounted on said shaft for rotation about a spin axis,
said support including a pair of nested annular members forming a damping chamber;
an annular damping member on said shaft and extending between said pair of annular members,
a damping fluid in said chamber in contact with said annular members,
and a pick-off device for indicating the angular movement of said support relative to said shaft.

6. A gyroscopic instrument according to claim 5 comprising a thermostatically controlled annular compensating member extending between said damping member and one of said pair of annular members,
said compensating member being expandable and contractable in accordance with the temperature of said fluid whereby to vary the damping action of said fluid.

References Cited by the Examiner
UNITED STATES PATENTS

| | | | |
|---|---|---|---|
| 2,868,023 | 1/1959 | Bonnell | 74—5 X |
| 2,955,472 | 10/1960 | Krupick et al. | 74—5.5 |

MILTON KAUFMAN, *Primary Examiner.*